C. PEARSON.
HOISTING MECHANISM.
APPLICATION FILED JUNE 22, 1911.

1,012,005.

Patented Dec. 19, 1911
2 SHEETS—SHEET 1.

Witnesses:
C. C. Palmer.
F. W. Hoffmeister.

Inventor.
Charles Pearson.
By O. W. Burgess
Attorney.

C. PEARSON.
HOISTING MECHANISM.
APPLICATION FILED JUNE 22, 1911.

1,012,005.

Patented Dec. 19, 1911.

2 SHEETS—SHEET 2.

Witnesses:
C. C. Palmer.
F. W. Hoffmeister

Inventor.
Charles Pearson
By E. W. Burgess
Attorney.

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

HOISTING MECHANISM.

1,012,005.     Specification of Letters Patent.     Patented Dec. 19, 1911.

Application filed June 22, 1911. Serial No. 634,800.

*To all whom it may concern:*

Be it known that I, CHARLES PEARSON, a citizen of the United States, residing at Chicago, in the county of Cook and State of Illinois, have invented certain new and useful Improvements in Hoisting Mechanism, of which the following is a specification.

My invention relates to hoisting mechanism in its general application, and in particular to that used in connection with hay stackers, wherein the fork carrying frame is raised and lowered by means of a rope and sheave mechanism; the object of my invention being to provide a hand operative brake mechanism adapted to control the movement of the rope guiding sheaves in a manner whereby undue chafing or wearing of the hoisting rope is effectually prevented. I attain these objects by means of the mechanism illustrated by the accompanying drawings, in which—

Figure 1:
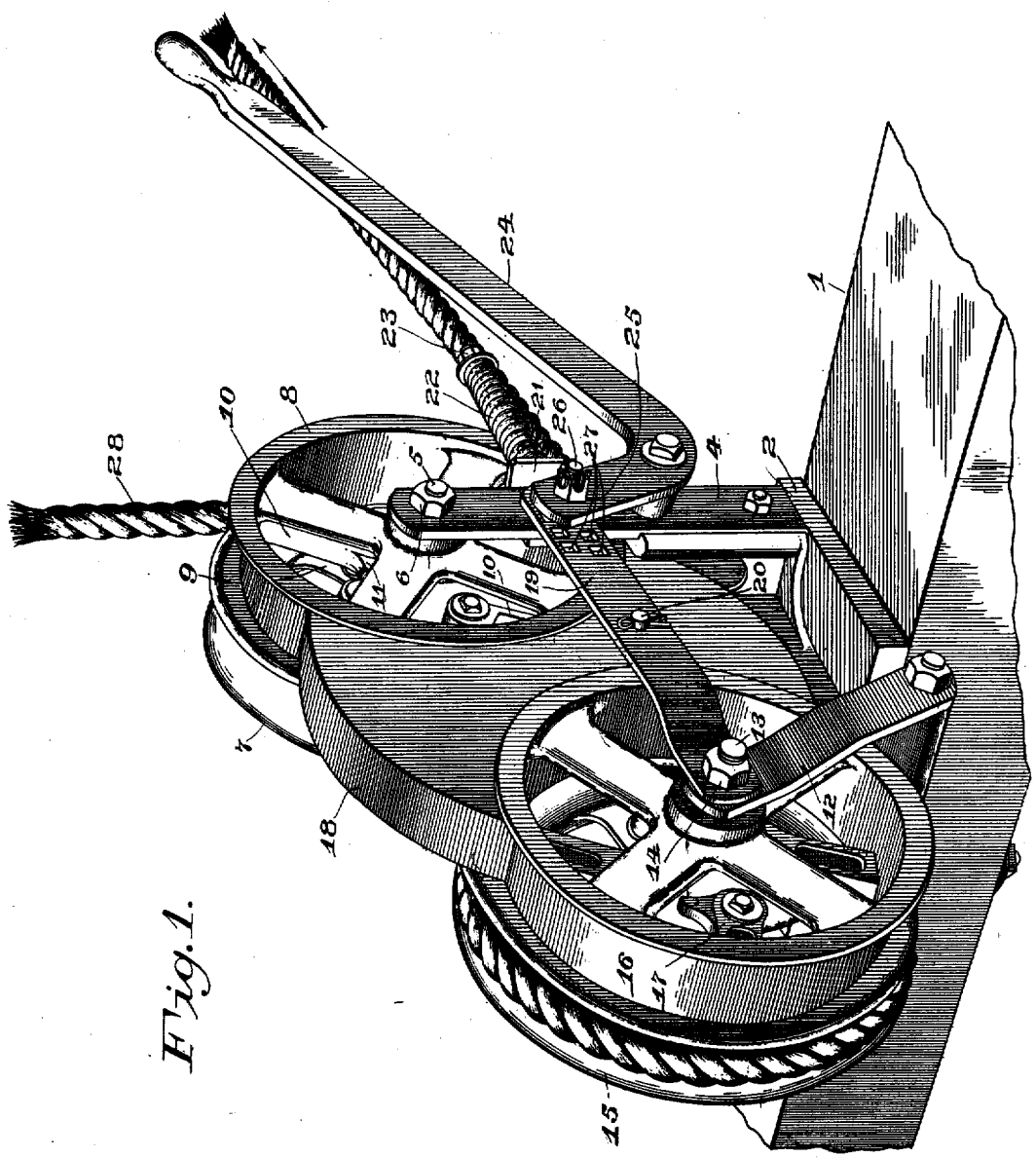
Figures 2, 3, 4:
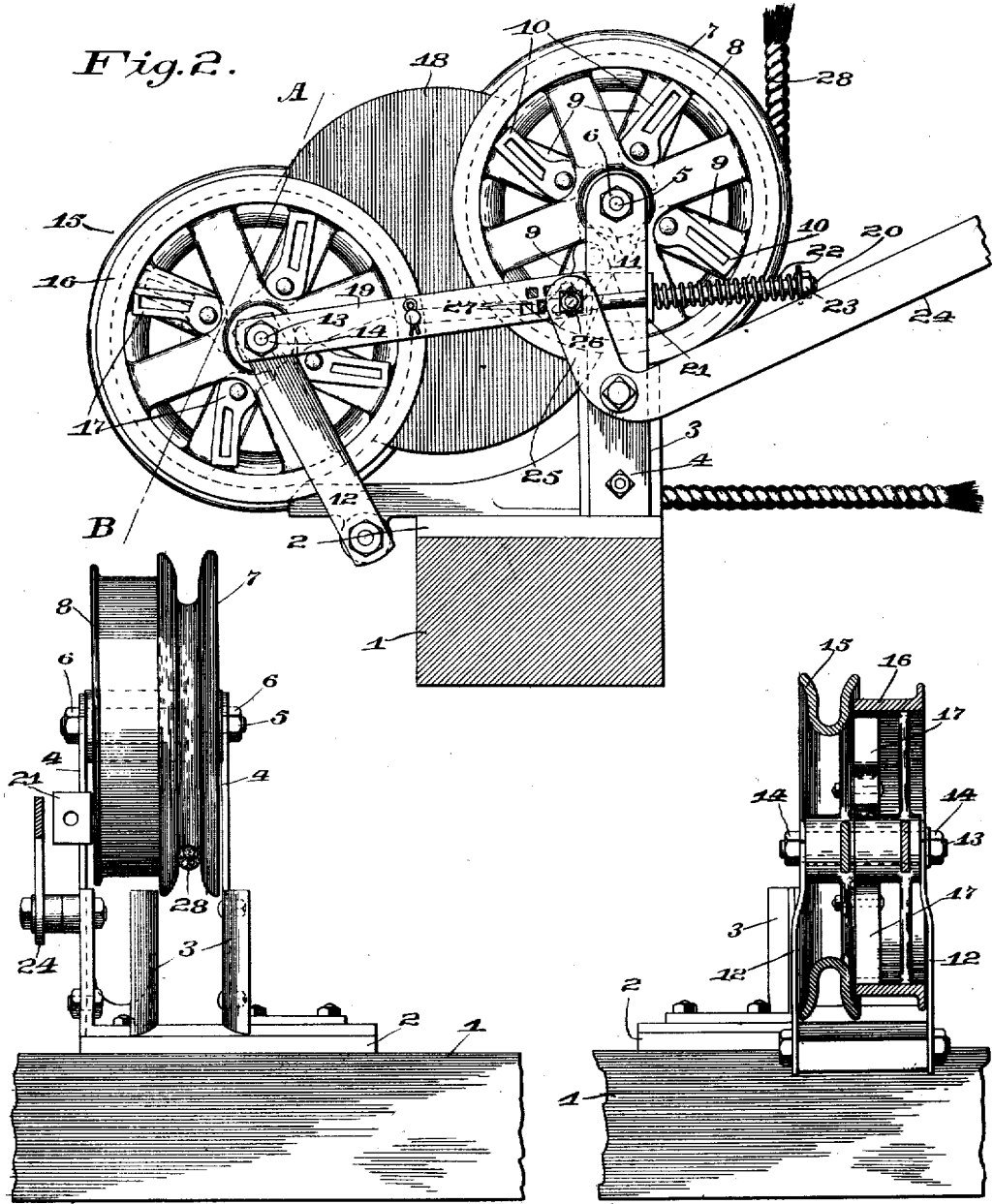

Figure 1 is a perspective view of my improved hoisting mechanism; Fig. 2 is a side elevation of Fig. 1; Fig. 3 is a front elevation of Fig. 2; and Fig. 4 is a vertical section of part of Fig. 2 along line A—B.

The same reference characters designate like parts throughout the several views.

1 represents part of the base frame of a hay stacker, 2 a base member of the hoisting mechanism secured to member 1, including vertically arranged rope guiding members 3 at one end thereof, to which are secured standards 4 upon opposite sides of the base member and having transverse openings at their upper ends that receive reduced portions at opposite ends of a short shaft 5 that is secured therein by means of nuts 6. Loosely journaled on said shaft, independent of each other, are a rope driving sheave 7 and a brake wheel 8. Pivotally mounted on spokes 9 of the rope sheave, adjacent the hub thereof, are clutch dogs 10 having heel members 11 that engage with the hub portion of the sheave in a manner to limit a swinging movement of the dogs in one direction, the outer ends of the dogs engaging with the inner surface of the rim of the brake wheel in a manner to clutch the sheave with said brake wheel when said sheave is rotated in one direction, or to be disengaged therefrom when the sheave is rotated in an opposite direction.

12 represents a swinging yoke having its lower end pivotally connected with the base 2 and at its opposite end provided with a short shaft 13 similar to shaft 5, that is secured therein by nuts 14. Mounted upon the shaft in a manner to rotate freely thereon are a rope sheave 15 and a brake wheel 16, like in form to sheave 7 and wheel 8, sheave 15 being provided with clutch dogs 17 that engage with the rim of the brake wheel in a like manner.

18 represents a double faced brake shoe that is interposed between the two brake wheels and normally is caused to yieldingly engage with the rims thereof by means of a bar 19, having its rear end pivotally connected with one end of the yoke 12 by having an opening that receives one end of shaft 13 and a link 20, having one end pivotally connected with the bar intermediate the ends thereof, the body of the link being slidably received by an opening through a clip 21 that is secured to one of the standards 4, and a compression spring 22 encircling the opposite end thereof and operative between an adjusting nut 23 and the clip in a manner to swing the yoke 12 in a direction to cause the brake wheels to engage with the double faced brake shoe.

24 represents a hand lever having a bell crank form, the lever being pivotally mounted upon one of the standards 4, and having the short arm 25 thereof pivotally connected with the opposite end of bar 19 by means of a bolt 26 that may be received by any one of a series of openings 27 in the bar, whereby the parts may be adjusted in a manner to compensate for wear upon the brake shoe.

In operation the rope 28 is passed under and up over the sheave 15, then downward and under sheave 7; and then in a direction to connect with the load or with the fork carrying frame of a hay stacker. Power is applied to the lower line in the direction shown by the arrows to lift the load, and when the rope is turned in that direction the rope sheaves are free to rotate upon their journals unaffected by the brake mechanism, the clutch dogs 10 and 17 being automatically disengaged from the brake mechanism when the sheaves are rotated in a direction to lift the load, and immediately engaged therewith if the sheaves are from any cause rotated in an opposite direction; and when it is desired to lower the load to permit the fork to become disengaged the lever 24 is turned about its axis in a forward direction and, through its connection with the yoke 12, causes the latter to swing in a direction to release the brake wheels from the shoe and permit them to rotate with the sheaves, the operator having full control of the mechanism to either lift or lower the load.

What I claim as my invention, and desire to secure by Letters Patent, is:

1. A hoisting mechanism including, in combination, two shafts in parallel relation, one of said shafts being movable toward and from the other, each of said shafts having a rope sheave and a brake wheel journaled thereon, clutch mechanism operative to engage said sheaves with said wheels when said sheaves are rotated in one direction, and inoperative when said sheaves are rotated in an opposite direction, a brake shoe arranged between said brake wheels, a spring operative to press said movable shaft toward said fixed shaft, and a hand lever operative to control the effective force of said spring.

2. A hoisting mechanism including, in combination, a base member, vertically arranged standards secured to one end of said base member, a shaft having opposite ends thereof secured to said standards, a rope sheave and a brake wheel loosely journaled upon said shaft, clutch dogs pivotally mounted upon said sheave and adapted to engage with said brake wheel when said sheave is rotated in one direction and to disengage therefrom when said sheave is rotated in an opposite direction, a swinging yoke having its lower end pivotally connected with the opposite end of said base member, a shaft having opposite ends thereof secured to the upper end of said yoke, a rope sheave and a brake wheel loosely journaled upon said shaft, clutch dogs pivotally mounted upon said sheave and adapted to engage with said brake wheel when said sheave is rotated in one direction and to disengage therefrom when said sheave is rotated in an opposite direction, a brake shoe interposed between said brake wheels, a spring-pressed link normally operative to swing said yoke toward said fixed shaft, and a hand lever operative to control the effective force of said spring.

3. A hoisting mechanism including, in combination, a base member, vertically arranged standards secured to one end of said base member, a shaft having opposite ends thereof secured to said standards, a rope sheave and a brake wheel loosely journaled upon said shaft, clutch dogs pivotally mounted upon said sheave and adapted to engage with said brake wheel when said sheave is rotated in one direction and to disengage therefrom when said sheave is rotated in an opposite direction, a swinging yoke having its lower end pivotally connected with the opposite end of said base member, a shaft having opposite ends thereof secured to the upper end of said yoke, a rope sheave and a brake wheel loosely journaled upon said shaft, clutch dogs pivotally mounted upon said sheave and adapted to engage with said brake wheel when said sheave is rotated in one direction and to disengage therefrom when said sheave is rotated in an opposite direction, a brake shoe interposed between said brake wheels, a bar having one end pivotally connected with said yoke, a link having one end pivotally connected with said bar, the body of said link being slidably connected with one of said standards, a coiled spring encircling the opposite end thereof and operative between a fixed part of the mechanism and an adjusting nut in a manner to yieldingly swing said yoke toward the fixed shaft, and a hand lever pivotally mounted upon said base member and adjustably connected with the opposite end of said bar whereby the effective pressure of said brake mechanism may be controlled.

CHARLES PEARSON.

Witnesses:
RAY PATTISON,
FRANK A. ZABILKA.

---

Copies of this patent may be obtained for five cents each, by addressing the "Commissioner of Patents, Washington, D. C."